United States Patent [19]

Castro et al.

[11] 4,314,040

[45] Feb. 2, 1982

[54] SOLID ANTISTATIC COMPOSITIONS

[75] Inventors: Anthony J. Castro, Oak Park; James W. Stoll, Woodridge, both of Ill.

[73] Assignee: Akzona Incorporated, Asheville, N.C.

[21] Appl. No.: 120,178

[22] Filed: Feb. 11, 1980

Related U.S. Application Data

[60] Division of Ser. No. 955,561, Oct. 27, 1978, Pat. No. 4,210,556, which is a division of Ser. No. 622,643, Oct. 15, 1975, Pat. No. 4,147,742, which is a continuation-in-part of Ser. No. 436,252, Jan. 24, 1974, abandoned.

[51] Int. Cl.$^3$ .......................... G08L 71/04; C09K 3/16
[52] U.S. Cl. ............................... 525/6; 260/DIG. 17; 525/391; 525/392; 525/905; 528/492
[58] Field of Search .................... 525/6, 391, 392, 905; 252/511

*Primary Examiner*—Theodore E. Pertilla
*Attorney, Agent, or Firm*—Francis W. Young; Robert F. Green

[57] ABSTRACT

A concentrated antistatic composition adapted for incorporation into various polymers such as olefins is prepared by admixing a liquid ethoxylated amine antistatic agent, such as an N,N-bis-(2-hydroxyethyl)alkenyl or mixed alkenyl and alkyl ($C_6$–$C_{18}$) amine, with various polymers such as, for example, polypropylene, heating to form a homogeneous liquid and rapidly cooling the mixture to form a solid antistatic agent. A normally liquid antistatic agent can thus be simply and readily blended into a polymer such as polyethylene as a dry, solid product to impart antistatic properties to the blended resin.

11 Claims, No Drawings

SOLID ANTISTATIC COMPOSITIONS

This is a division of application Ser. No. 955,561, filed Oct. 27, 1978, now U.S. Pat. No. 4,210,556 which is a division of application Ser. No. 622,643, filed Oct. 15, 1975, now U.S. Pat. No. 4,147,742, which in turn is a continuation-in-part of application Ser. No. 436,252, filed Jan. 24, 1974, now abandoned.

DESCRIPTION OF THE INVENTION

The present invention relates to polymeric materials, and, more particularly, to novel solid antistatic agents for incorporation into such polymeric materials and to a process for making such novel antistatic agents.

It has long been known that various polymers tend to collect electrostatic charges on their surface. This tendency creates difficulty in the handling of the polymers and of articles made therefrom, for it occurs during storage, as well as in the course of processing the polymers into shaped forms, such as filaments, sheets, films, and molded plastics.

Such electrostatic charges cause dust and dirt particles to adhere to the plastic surfaces and, also, the plastic surfaces to adhere to each other or to the equipment used in processing. Under certain circumstances, the accumulated charges may give rise to sparks, with an attendant fire hazard. The tendency toward the building of electrostatic charges is especially marked in the case of polymers and copolymers made from ethylenically unsaturated monomers, such as polymers and copolymers of vinyl chloride, vinylidene chloride, styrene, and the various polyolefins, such as polyethylene, polypropylene, and polybutylene. These are referred to herein as olefinic polymers.

Among the approaches taken in the prior art to reduce the tendency of plastic materials toward electrostatic charging has been either to coat the plastic material with an antistatic composition, or to incorporate it into the body of the plastic material. The latter expedient is generally considered to be more effective. Compounds which have been proposed for this purpose include polyalkylene glycols and their esters and ethers, and a wide variety of amines and amides.

Thus, for example, it has been proposed to incorporate into an olefinic polymer such as polyethylene, during compounding, molding or fabrication, as an antistatic additive, a small amount of at least one N,N-(hydroxyalkyl)-alkylamine, and a process of this type is disclosed in U.S. Pat. No. 3,631,162.

It is also known to incorporate into polyolefins, such as polyethylene film, a material which functions as a slip agent, by migrating to the surface in sufficient quantity to provide thereon a thin film which functions as a lubricant. Long chain aliphatic amides are usually employed for this purpose, and a system of this type is disclosed in, for example, U.S. Pat. No. 3,467,706.

Many of the amine or amide antistatic agents are liquids which, when incorporated into the resin compositions, migrate to the surface at an undesirably rapid rate, causing losses by evaporation, diminished antistatic effectiveness, development of undesirable odors, and adversely affecting the surface properties of the plastic, for example by promoting cracking or crazing. For example, it was stated in the above-mentioned U.S. Pat. No. 3,631,162 (Table III, Footnote 4) that, at 8 parts of N,N-bis-(2-hydroxyethyl) alkylamine in 1000 parts of polyethylene, large amounts of the antistatic agent exuded to the surface. Previous attempts to incorporate a high percentage, i.e. greater than about 10%, of a liquid antistatic agent into polymers have been limited by the room temperature solubility of the antistatic agent in the polymer. That is, when the solubility in the polymer is exceeded, as by cooling a solution at high temperatures, two phases will be formed, namely, a liquid phase containing some dissolved polymer and a solid phase containing some dissolved liquid.

It is accordingly an object of the present invention to provide solid antistatic agents which incorporate normally liquid amine antistatic compounds.

A further object lies in the provision of solid antistatic agents capable of being added to various polymeric materials in amounts in excess of those achieved using liquid antistatic agents.

Yet another object of this invention is to provide an economical process for forming such solid antistatic agents.

Other objects and advantages of the present invention will be apparent as the following description proceeds.

While the invention is susceptible of various modifications and alternative forms, specific embodiments thereof have been shown by way of example and will be hereinafter described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

In brief, the present invention is predicated on the discovery that, by appropriate processing steps, certain normally liquid amine antistatic agents can be converted into novel antistatic agents which behave as solids. Such novel antistatic agents then possess the advantageous characteristics of antistatic agents wherein the active material is itself normally solid.

More particularly, and in accordance with a principal aspect of the present invention, it has been found that certain liquid amine antistatic agents can be converted into solid form, suitable for incorporation into a polymer, by admixing the amine with a suitable resin carrier such as, for example, polypropylene, heating the thus-formed mixture to a temperature above the softening temperature of the resin used as the carrier such that a homogeneous liquid is formed, and then rapidly cooling the liquid to form a solid homogeneous mass. It has been found that adequate cooling is achieved when the liquid mixture becomes completely solid within a period of time between about ½ sec. to about 10 minutes, depending upon the quantity of liquid involved and the cooling means employed.

In practice, it has been found that the rate of cooling can be controlled so as to obtain the desired results in at least two ways. In the first, a metal plate at ambient temperature (25° C.) is used as a heat sink, and will extract heat from the material at a sufficient rate if the homogeneous solution is poured rapidly onto the plate in a thin layer. Best results have been achieved with layers less than ¼ inch thick, but similar results are observed where layers up to about ½ inch or so thickness are obtained.

In the second method, a rapid cooling rate is achieved by pouring the solution of the liquid resin carrier and antistatic agent into a relatively large amount of an inert liquid such as water at a temperature from 0° C. to 75° C. The preferred temperature range is from 60° C. to 75° C. since lower temperatures cause significant amounts of water to be trapped in the globules which can, however, be removed by drying in a vacuum. Globules of a solid combination of antistatic agent and the resin carrier having a diameter of ⅛ to 1/16 inches are obtained which are not wet to the touch.

It might have been expected that, upon cooling, a liquid phase of the amine would separate containing some dissolved resin, especially when the normal solubility of the amine in the resin employed as the carrier is exceeded. It has been observed, for example, that if the hot homogeneous mixture of resin carrier and liquid antistatic agent is stirred continuously while the mixture cools, the mixture does not cool to a homogeneous solid, but two visually discernible phases result. However, with rapid cooling of the hot homogeneous mixture of antistatic agent and resin carrier according to the invention, no visually discernible phase separation occurs. This unexpected behavior takes place even where it is known that, for example, merely by mixing, not more than about 10% by weight of antistatic agent could be incorporated when polypropylene is used as the resin carrier without the separation of a visually discernible liquid phase. Thus, such resulting antistatic agent-polypropylene composition contains much more of the antistatic agent than would be expected from room temperature solubility considerations alone.

With respect to the antistatic constituent, any normally liquid (i.e.—at ambient temperatures) antistatic agent may be employed which is capable of blending homogeneously with a resin carrier at elevated temperatures and forms a solid material upon cooling without the presence of a visually discernible phase separation. Still further, such antistatic agents should not significantly degrade upon heating to the temperatures required to render the mixture of the resin carrier and antistatic homogeneous.

In accordance with a preferred embodiment of the present invention, normally liquid ethoxylated aliphatic amines are employed which are derived from alkyl, primary alkenyl or mixed alkenyl and alkyl amines in which the alkenyl and alkyl moiety each have a chain length of between about 6 and 18 carbon atoms.

Particularly preferred amine antistatic agents are N,N-bis-(2-hydroxyethyl) alkenyl or mixtures of alkenyl and alkyl ($C_{12}$–$C_{18}$) amines which are liquid at ambient temperatures. Such amines are obtained from distilled coco, soya, oleyl or tallow, or mixtures thereof. Examples of these amines are diethoxylated tallow (mixed alkenyl and alkyl) amine, and diethoxylated coco amine, which are marketed under the designations Armostat 310 and Armostat 410, respectively, by Armak Company, Chicago, Ill.

Considering the chain length of the alkenyl and alkyl moiety of the preferred ethoxylated aliphatic amines, the ability to form a satisfactory solid antistatic agent diminishes when the chain length is less than $C_8$. A chain length of $C_6$ represents the demarcation between an acceptable and unacceptable product. Chain lengths in excess of $C_{18}$ (e.g. up to $C_{22}$ or more) can conceptually be utilized; however, amines with such chain lengths are typically normally solid so that, for most purposes, incorporation in the solid antistatic agents of the present invention will not yield any significant benefits. In addition, from the functional standpoint, chain lengths of $C_{12}$ to $C_{18}$ have been found to provide the most effective antistatic properties.

If desired, mixtures of useful normally liquid antistatic agents can also be employed. Of course, when mixtures are employed, the particular mixture should be capable of being processed with a resin carrier to form the novel antistatic agents in accordance with the present invention as is described herein.

The type of resin used as the carrier for the normally liquid antistatic agent may be varied within wide limits. From the functional standpoint, any resin may be employed which will form a homogeneous liquid with the antistatic agent at elevated temperatures and thereafter, upon cooling, forms a solid material, as has been described herein.

Representative examples of suitable carriers include polyolefins such as high and low density polyethylene, polypropylene and polystyrene. In addition, polyaryl ethers such as polyphenylene oxide, styrene-acrylonitrile copolymers, acrylic acid copolymers such as ethylene-acrylic acid and styrene-butadiene rubbers may also be suitably used.

It should also be appreciated that, if desired, mixtures of resins may be employed and that copolymers as well as homopolymers can be utilized. For example, in addition to using polyethylene and polypropylene homopolymers, ethylene-propylene copolymers are useful. Still further, the resin carrier can suitably comprise a mixture of a useful resin such as polyphenylene oxide blended with minor amounts of a resin that, by itself, could not be utilized, such as a polycarbonate. The utility of a particular resin mixture or copolymer can be readily determined as has been described herein. Thus, to be useful, the particular carrier must be capable of forming a homogeneous solution at elevated materials with the particular antistatic agent being employed as well as forming, after cooling, a solid material with no visually discernible liquid phase.

With respect to relative amounts of the constituents, the normally liquid antistatic agent utilized can be present in an amount of from about 10 to about 90%, based upon the total weight of the resin and antistatic agent. While amounts less than about 10% may be employed, the advantages of the present invention are substantially lessened since such amounts can be achieved by normal extrusion techniques. Similarly, amounts up to perhaps 95% by weight or so might be useful in certain situations. However, the solid antistatic agent formed at such concentrations is relatively weak; and liquid will often exude out of the material when placed under load-bearing conditions such as commercial sized containers. Due to economical and processing considerations, it is preferred to maintain the liquid antistatic agent content in the range of from 50 to 75%.

While the factors which determine whether a solid material is formed are not fully understood, certain useful observations can be made. For example, when polypropylene is used as the resin carrier, it has generally been found useful to increase the rapidity of the cooling as the amount of normally liquid antistatic agent is increased. Further, other factors which must be taken into consideration include the initial viscosity of the homogeneous solution at the elevated temperature being used and the rate at which the viscosity builds up as the homogeneous solution is being cooled. Still further, the initial temperature at which the homogeneous solution is formed and the $\Delta T$ between that temperature and the temperature of the cooling medium must also be taken into account.

It can, in general, be observed that the range of useful cooling rates may be expanded by appropriate consideration of the parameters set forth herein. Thus, a wider range of cooling rates may, in general, be utilized with increasing resin contents, higher initial viscosities (influenced, of course, by the temperature at which a homogeneous solution is formed) and the magnitude of the ΔT. More rapid viscosity buildups will also likely increase the range of useful cooling rates.

The solid antistatic agent product of the present invention, as has been described herein, comprises a solid material with no visually discernible liquid phase. Typically, the product will be dry to the touch. However, it is believed that the normally liquid antistatic employed retains its liquid character in the product but is masked by the polymer carrier so as to give the appearance of a solid material together with allowing the product to be used in the fashion as would a true solid, with the attendant advantages.

It should be appreciated that the solid product of the present invention, while generally visually solid after cooling, may in certain situations contain surface liquid. Such surface liquid can, however, be removed by any suitable means such as, for example, by blotting with an absorbent material or by a solvent rinse. The resulting product will then be a solid antistatic agent according to the present invention, i.e.—a solid material with no visually discernible liquid phase.

With respect to the characteristics of the novel antistatic agents of this invention, the prime phenomena is not surface adsorption of the normally liquid antistatic agent on the surface of the resin carrier, i.e.—as a substantially continuous film or coating of the resin. In such a structure, the amount of liquid additive that could be tolerated would be dependent upon the surface area of the resin carrier. This is not the case in the present invention since the amount of the liquid antistatic agent which can be tolerated is wholly independent of the surface area of the resin carrier.

The solid antistatic agents of the present invention can be further processed to provide any physical form that is desired. In general, the physical form will be dependent upon the virgin resin to which it is to be added to impart the desired antistatic properties. As illustrative examples, resin is typically commercially available as powders, pellets or granules. To allow optimum blending with the virgin resin, the solid antistatic agent of this invention is thus desirably processed into powder, pellet or granular form, depending upon the physical form of the virgin resin to which it will be added.

The type of virgin resin will also, to some extent, determine the polymer which should be utilized as the carrier. Thus, if the antistatic agent is to be used with polyethylene resin, polyethylene is desirably employed as the resin carrier. Any resin can, however, be used as the carrier so long as it is compatible with the virgin resin and does not significantly and adversely affect the properties of the virgin resin. Moreover, in view of the relatively small amount of resin carrier which is contained in the solid antistatic agents of this invention, the problem of compatibility is minimized.

The amount of antistatic agent which should be incorporated into the virgin resin is known and can be varied as desired. Amounts effective to provide amounts of antistatic agent in the range of about 0.05% to about 3.0% or so (based upon total weight) will generally be satisfactory. As is known, the amount utilized depends upon the type of resin being treated and the fabrication conditions used for forming the plastic article. The antistatic agents of the present invention can be added to the virgin resin by any desired means, dry blending or addition in an extrusion process being typical illustrative examples.

The following examples are intended to be merely illustrative of the present invention and not in limitation thereof:

EXAMPLE 1

A mixture of 50% by weight of N,N-bis-(2-hydroxyethyl)tallow amine (Armostat 310) and 50% by weight of polypropylene pellets (melt flow index—8.0) is heated with stirring at 180° C. until a clear homogeneous liquid is obtained. The liquid is then cooled rapidly, within a period of about 10 minutes, to room temperature, whereupon it forms a dry solid mass. The mass is ground to a dry powder and incorporated into molten polyethylene resin at a temperature of about 185° C. in an amount equivalent to 0.15% of amine and 0.15% of polypropylene respectively, by weight.

A polyethylene product exhibits antistatic and increased slip properties. A sample aged for 6 days, when charged to 800 volts was found to discharge to zero volts within 45 seconds, as compared with a control sample of untreated polyethylene which retained its charge indefinitely.

Static coefficients of friction were as follows:

| | |
|---|---|
| Control sample with no additive | 0.70 |
| Sample with amine alone (at 0.1%) | 0.50 |
| Sample with amine and polypropylene (each at 0.15%) | 0.36 |

EXAMPLE 2

The same procedure was followed as in Example 1, except that the proportion of the amine of Example 1 incorporated into the polypropylene was 75% by weight. The solid material was ground and incorporated into polyethylene in the same proportions as to the amine component as in Example 1, i.e. 0.15% amine and 0.05% polypropylene and evaluated for antistatic and slip properties with the following results: a sample aged for five days when charged to 800 volts was found to discharge to zero volts in 18 seconds. Static coefficient of friction on this sample was found to be 0.51.

EXAMPLE 3

Following the same procedure as in Example 2, 75% by weight of the amine of Example 2 was incorporated into polystyrene (crystal grade and having a melt flow index of 4.5). In this instance, the temperature was raised to 240° C. to dissolve the beads of polystyrene. Stirring was continued for about five minutes after complete solution took place. Then about 1 cc. was poured to a depth of about 1/16 inches on to a flat metal plate and chilled rapidly, i.e. in about five minutes, to give a brittle, dry material. A sample of about 50 cc. was poured into a flat dish to a depth of about ½ inches and upon cooling it became hard, but was slightly wet on the top and bottom. A third sample was allowed to remain in the beaker to a depth of about 1½ inches and was cooled by standing. The third portion separated into a liquid and a solid phase.

The dry, brittle antistatic concentrate prepared above can be incorporated into an olefinic polymer, for example, molten polystyrene resin, by adding ground concentrate in an amount equivalent to 3% of amine by weight and cooling. The antistatic and slip properties of this material are determined in the same manner as in Example 1.

Additional samples of the above were made varying the percentages of amine incorporated in the polystyrene and cooling by pouring the dissolved material into water at various temperatures as indicated in Table I and then placing the samples in a manila envelope.

TABLE I

| Percentage of Amine: Polystyrene | Temp. of Water (°C.) | Temp. of Sol. at Time Poured (°C.) | Characteristics of Product |
|---|---|---|---|
| 80:20 | 0 | 230 | solid, brittle, greasy feel; some trapped H₂O |
|  | 25 | 230 | solid, stained envelope* |
|  | 60 | 230 | solid, stained envelope* |
| 75:25 | 0 | 230 | solid, brittle, slightly greasy; some trapped H₂O |
|  | 25 | 230 | solid, brittle, slightly stained envelope* |
|  | 60 | 230 | solid, dry |
|  | 75 | 230 | little trapped H₂O |
| 70:30 | 0 | 230 | solid, brittle, dry |
|  | 25 | 230 | solid, brittle, very slightly stained envelope* |
|  | 60 | 230 | solid, brittle, very slightly stained envelope* |
|  | 75 | 230 | solid, brittle, very slightly stained envelope* |
| 60:40 | 0 | 240 | solid, dry |
|  | 25 | 240 | solid, dry |
|  | 60 | 240 | solid, dry |
|  | 75 | 240 | solid, dry |

EXAMPLE 4

The same procedure was followed as in Example 3, except that impact grade polystyrene (Monsanto "Lustrex 77", melt flow index—4.0 and density—1.04) was used. Impact grade polystyrene is actually a copolymer of styrene and butadiene. The mixture was heated with stirring to a temperature of 235° C. and poured quickly into a chilled stainless-steel pan so that a film about 1/16 inches thick was formed which cooled in one minute. The solid material was found to be dry and hard, except for a small amount of condensation on the bottom. After standing over night, the bottom was found to be dry with no trace of greasiness. Another sample was dissolved at 220° C. and poured on to a 1/64 inch stainless steel plate at room temperature (25° C.) to cool. A hard, dry solid ⅜ inches thick was formed.

EXAMPLE 5

Following the same procedure as Example 1, a solid dry product was obtained by incorporating 75% by weight, N,N-bis-(2-hydroxyethyl) coco amine (Armostat 410) in 25% by weight of the polypropylene identified in Example 1. A small amount was cooled on a spatula which was dry to the touch after several hours. Similar antistatic and slip effects can be obtained by incorporating the ground product into polyethylene in an amount equivalent to 0.15% of amine.

EXAMPLE 6

A mixture of 110.6 grams of the polypropylene and 64.4 grams of the amine(both identified in Example 1), was stirred at 175° C. to give a final concentration of 36.8% amine by weight. After cooling, the white, product was found to be solid and dry.

EXAMPLE 7

A run similar to Example 3 was made using the crystal grade polystyrene identified therein. Solution was complete at about 235° C. A portion of the run was cooled by pouring the molten mixture into a chilled stainless steel pan. The material was dry and hard with only a slight wetness at the edges.

Another portion of the molten material was poured into water. On cooling, this product was hard and dry.

EXAMPLE 8

Following the same procedure as in Example 1, 75% by weight of the amine of Example 1 was incorporated into General Electric "Noryl 731" (a blend of 17% polyphenylene oxide with 69% high impact polystyrene and minor amounts of polybutadiene and polyethylene). After stirring at 250° C. for about five minutes, the mixture was poured into flat dishes to cool. The product was dry and hard with no trace of greasiness.

EXAMPLE 9

The same procedure was followed as in Example 1, except that 75% by weight of the amine of Example 1 was incorporated into 25% by weight of a styrene-acrylonitrile copolymer (Dow Chemical "Tyril Crystal 71H"). Solution began to take place at 255° C. and the temperature was then raised to 275° C. to speed the solution process. One half of the solution was poured into a metal sheet to cool and the other half was poured into a flat glass dish. Both solutions cooled within about two minutes and formed a hard, brittle solid although some surface wetness was observed.

EXAMPLE 10

The same procedure and constituents set forth in Example 1 were used, except that the portion of the amine of Example 1 incorporated into the polypropylene was 90% by weight. The mixture was stirred vigorously while heating to a temperature of 200° C. The solution was poured on to a sheet of aluminum foil to a depth of about 50 mills for quick chilling. A solid was obtained that was quite wet. At this proportion of amine, it appears that a small amount of a liquid phase is formed. While this wet product may be useful for some purposes (or the surface liquid phase removed as by blotting with an absorbent material), to obtain a completely dry product, either a somewhat lower proportion of amine must be used or cooling achieved at a faster rate. It is contemplated that a faster cooling rate can be achieved in the following manner: feed a metered amount of the heated solution on to a moving, chilled conveyer. The rate of cooling can be controlled by varying the feed rate of polymer so as to control the thickness of the material on the conveyor. The speed of the conveyer and the temperature of the conveyer plates can also be regulated to achieve different cooling rates. The conveyer plates themselves can be cooled with a circulating cooling medium, such as air, water, brine solution, Freon, etc.

EXAMPLE 11

Following the same procedure as in Example 5, 75% by weight of N,N-bis-(2-hydroxyethyl) coco amine (Armostat 410) was incorporated into 25% by weight of crystal grade polystyrene (identified in Example 3) and heated with stirring to 215° C. After stirring for ten minutes, the sample was chilled by pouring into a flat dish. A solid dry material was formed except for a slight wetness on the bottom and top. The solid material can be ground and incorporated into polyethylene in an amount equivalent to 0.15% amine to obtain similar antistatic slip effects.

EXAMPLE 12

Following the same procedure as in Example 12, 50% by weight of the amine of Example 11 was incorporated in 50% by weight of crystal grade polystyrene (identified in Example 3) at a temperature of 230° C. and mixed for a few minutes until it became homogeneous. A sample was poured on to a stainless steel plate at room temperature (25° C.) to cool in a layer about 3/16 inches thick. Another sample was cooled by pouring into a Petrie dish at room temperature. Both samples, when cool, were hard and dry.

EXAMPLE 13

Samples of the solid antistatic agent concentrate prepared in accordance with the preceding examples and containing 75% by weight of the amine of Example 5 and 25% polypropylene (identified in Example 1) were added to powdered charges of high density polyethylene in a "rotomolder" in amounts equivalent to 0.2% and 0.4% by weight of amine to polyethylene. Rotomolding equipment such as that manufactured by Roto Mold & Die Company, Cuyahoga Falls, Ohio, is well known and available on the market. In the rotomolding process, dry powdered resin is placed in a closed mold and rotated until the resin charge is evenly distributed around the inside surface thereof. The resin is then heated to its fusion temperature and thereafter cooled. In this example, dry, powdered solid antistatic agent was mixed with the resin and charged to the "rotomolder". The antistatic agent imparted good to excellent antistatic properties to the final molded product as indicated by the half-life, i.e. the time for the charge to decay to one-half the original value, of the samples in Table II:

TABLE II

| Conc. of Amine | Initial Charge | Half-Life |
|---|---|---|
| 0.0% (control) | 750 volts | no decay |
| 0.0% (control) | 750 volts | no decay |
| 0.2% | 2,000 volts | 5 seconds |
| 0.2% | 1,8000 volts | <1 second |
| 0.2% | 1,250 volts | <½ second |
| 0.4% | 3,200 volts | <½ second |
| 0.4% | 2,200 volts | <½ second |

No attempt was made to incorporate other liquid or solid antistatic agents since rotomolders have heretofore been unable to incorporate into rotomolded resins any antistatic agent which proved effective.

EXAMPLE 14

Additional samples of solid antistatic agent were formed using the normally liquid amine identified in Example 1 and various polymers as the resin carrier by the procedure generally described as follows.

The amine and the polymer were mechanically stirred while the temperature was raised to about 230° C., at which point a clear solution was obtained. After 20 minutes at this temperature, the solution was poured onto a metal plate at room temperature. A solid material was obtained, containing substantially the amount of the amine added.

The polymers used and the relative amounts of the constituents are set forth in Table III.

TABLE III

| Polymer | Amount of Amine, % by wt., based on total weight of polymer and amine |
|---|---|
| Low density polyethylene[1] | 75 |
| Low density polyethylene[1] | 50 |
| Low density polyethylene[1] | 95 |
| High density polyethylene[2] | 95 |
| High density polyethylene[2] | 65 |
| High density polyethylene[2] | 55 |
| High and low density polyethylene[3] | 75 |
| Polyphenylene oxide and polystyrene blend[4] | 75 |
| Styrene-butadiene rubber[5] | 75 |
| Ethylene-acrylic acid copolymer[6] | 75 |

[1]Union Carbide "DND 2004" (melt flow index - 1.0, density - 0.919)
[2]Union Carbide "DFD 0100" (melt flow index - 2.1, density - 0.922)
[3]50/50 weight mixture of Nos. 1 and 2
[4]General Electric "Noryl 731"
[5]Shell Chemical "Kraton 1002" (density - 0.92–0.94)
[6]Du Pont "Surlyn 1652" (melt flow index - 4.4)

EXAMPLE 15

A solid antistatic agent was formed using the normally liquid amine of Example 1 and an ethylene-propylene copolymer (Phillips "CGH-040-02", melt flow index—4.0).

The amine and the copolymer, in amounts to provide a weight ratio of amine to copolymer of 75/25, based on the total weight, were heated to a temperature in excess of 200° C. until a homogeneous solution was obtained; and the solution was then poured onto a metal plate at room temperature and allowed to cool.

A very hard and flexible solid material was formed.

EXAMPLE 16

A solid antistatic agent was formed by admixing 25 grams of the polypropylene identified in Example 1 with 75 grams of N,N-bis-(2-hydroxyethyl) octylamine.

The mixture was heated with high speed stirring. The resin formed clumps at 160° C.; at 165° C., a resin mass was formed and, at 255° C., the viscosity increased. At 260° C., a viscous homogeneous phase formed and was poured onto a metal plate at room temperature.

Upon cooling, the material appeared as a strong, opaque and dry solid.

EXAMPLE 17

A solid antistatic agent was formed by admixing 25 grams of the polypropylene identified in Example 1 with 75 grams of N,N-bis-(2-hydroxyethyl) decylamine.

The mixture was heated with high speed stirring. The resin formed clumps at 160° C.; at 165° C., a resin mass was formed and, at 240° C., a viscous homogeneous phase formed and was poured onto a metal plate at room temperature.

On cooling, the material was strong and dry.

Each of the solid products made according to Examples 6 through 12 can be incorporated in polyethylene in an amount equivalent to 0.05% to 0.3% amine by weight, in polystyrene in an amount equivalent to 2 to 3% of amine by weight or in other olefinic polymers in effective amounts to impart good antistatic and slip characteristics to the blended polymer. The material is readily added to the olefinic polymer as, for example, in a mixture at a temperature above the softening point of the polymer, preferably above about 150° C. by adding ground particles of the dry, solid antistatic agent to the molten olefinic polymer.

Thus, as has been seen, the present invention provides an advantageous process for converting a normally liquid antistatic agent into a form capable of being handled as a solid. The resin carrier utilized to allow achievement of this objective need be present in only minor amounts. The resulting novel solid antistatic agent can then be incorporated in the virgin resin being treated in amounts far in excess of the level which can be achieved based on solubility characteristics of the liquid antistatic agent involved. Still further, in some situations, as can be seen from the subject examples, the solid antistatic agent appears to impart improved slip characteristics to the treated resin.

What is claimed is:

1. An antistatic agent adapted for incorporation into a polymer subject to the development of electrostatic charges to render said polymer antistatic comprising a normally liquid N,N-bis-(2-hydroxyethyl) aliphatic ($C_6$–$C_{18}$) amine having antistatic properties and a resin carrier selected from the group consisting of, polyphenylene oxide-polystyrene blends, said amine being present in an amount of about 10% to about 90%, based on the total weight of the amine and resin carrier and said antistatic agent being a solid with no visually discernible liquid phase.

2. The antistatic agent of claim 1 wherein said amine is N,N-bis-(2-hydroxyethyl) alkenyl or mixed alkenyl and alkyl ($C_6$–$C_{18}$) amine.

3. The antistatic agent of claim 2 wherein said amine is selected from the group consisting of N,N-bis-(2-hydroxyethyl) coco amine and N,N-bis-(2-hydroxyethyl) tallow amine.

4. The antistatic agent of claim 1 wherein said amine is present in an amount of from about 50% to 75% by weight.

5. A process for the preparation of a dry, solid antistatic agent adapted for incorporation into a polymer subject to the development of electrostatic charges to render said polymer antistatic comprising admixing with a resin carrier selected from the group consisting of polyphenylene oxide-polystyrene blends, from about 10% to about 90% based on total weight of normally liquid N,N-bis-(2-hydroxyethyl) aliphatic ($C_6$–$C_{18}$) amine having antistatic properties, heating the thus formed mixture to a temperature such that a homogeneous liquid is formed, and then rapidly cooling to form a solid antistatic agent with no visually discernible liquid phase.

6. The process of claim 5 in which the cooling takes place within a period of between about ½ second to about 10 minutes.

7. The process of claim 5 wherein said amine is N,N-bis-(2-hydroxyethyl) alkenyl or mixed alkenyl and alkyl ($C_6$–$C_{18}$) amine.

8. The process of claim 7 wherein said amine is selected from the group consisting of N,N-bis-(2-hydroxyethyl) coco amine and N,N-bis-(2-hydroxyethyl) tallow amine.

9. The process of claim 5 wherein said mixture is heated to a temperature slightly above the softening temperature of the resin carrier.

10. A method for rendering antistatic a polymer subject to the development of electrostatic charges which comprises adding to said polymer in an amount effective to render said polymer antistatic an antistatic agent consisting of a normally liquid N,N-bis-(2-hydroxyethyl) aliphatic ($C_6$–$C_{18}$) amine having antistatic properties and a resin carrier selected from the group consisting of polyphenylene oxide-polystyrene blends, said amine being present in an amount of about 10% to about 90%, based on the total weight of the amine and the resin carrier and said antistatic agent being solid with no visually discernible liquid phase.

11. The method of claim 10 wherein said amine is N,N-bis-(2-hydroxyethyl) alkenyl and mixed alkenyl and alkyl ($C_{12}$–$C_{18}$) amine.

* * * * *